(12) United States Patent
Lippey et al.

(10) Patent No.: US 7,110,175 B2
(45) Date of Patent: Sep. 19, 2006

(54) DISPLAY SCREENS

(75) Inventors: Barret Lippey, Belmont, MA (US); Steve O'Dea, Wilmington, MA (US)

(73) Assignee: Bose Corporation, Farmington, MA (US)

( * ) Notice: Subject to any disclaimer, the term of this patent is extended or adjusted under 35 U.S.C. 154(b) by 26 days.

(21) Appl. No.: 10/789,688

(22) Filed: Feb. 27, 2004

(65) Prior Publication Data

US 2005/0190442 A1  Sep. 1, 2005

(51) Int. Cl.
G03B 21/56 (2006.01)
G03B 21/60 (2006.01)

(52) U.S. Cl. .................. 359/443; 359/449; 359/459

(58) Field of Classification Search ............... 359/443, 359/449, 459
See application file for complete search history.

(56) References Cited

U.S. PATENT DOCUMENTS

| | | | | |
|---|---|---|---|---|
| 1,610,423 A * | 12/1926 | Cawley | ...................... | 353/20 |
| 3,964,822 A * | 6/1976 | Yamashita | ................... | 359/443 |
| 4,025,160 A * | 5/1977 | Martinez | ..................... | 359/443 |
| 4,201,449 A | 5/1980 | Campion et al. | ........... | 350/117 |
| 4,792,209 A | 12/1988 | Laine et al. | ................. | 350/117 |
| 5,035,490 A * | 7/1991 | Hubby, Jr. | .................... | 349/63 |
| 5,111,337 A | 5/1992 | Martinez | ..................... | 359/443 |
| 5,148,309 A | 9/1992 | Yamada et al. | ............. | 359/443 |
| 5,418,584 A * | 5/1995 | Larson | ........................ | 353/122 |
| 5,691,844 A * | 11/1997 | Oguchi et al. | .............. | 359/465 |
| 6,172,809 B1 * | 1/2001 | Koike et al. | ................. | 359/487 |
| 6,421,106 B1 * | 7/2002 | Takatsuka et al. | .......... | 349/113 |
| 6,476,888 B1 * | 11/2002 | Yamanashi | .................. | 349/106 |
| 6,476,965 B1 * | 11/2002 | He et al. | ..................... | 359/455 |
| 6,589,649 B1 * | 7/2003 | Oya et al. | ................... | 428/343 |
| 6,704,080 B1 * | 3/2004 | Hara | .......................... | 359/459 |
| 6,724,535 B1 * | 4/2004 | Clabburn | .................... | 359/619 |
| 2003/0096102 A1 * | 5/2003 | Yoshihara et al. | .......... | 428/330 |

* cited by examiner

*Primary Examiner*—Christopher Mahoney
(74) *Attorney, Agent, or Firm*—Fish & Richardson, P.C.

(57) ABSTRACT

An assembly for use in a projection screen that includes a metal reflective surface, and a layer above the metal reflective surface to reduce an amount of difference in reflectivity of the metal reflective surface for light polarized in two different directions.

34 Claims, 14 Drawing Sheets

DISPLAY SCREENS

TECHNICAL FIELD

Figure 1:
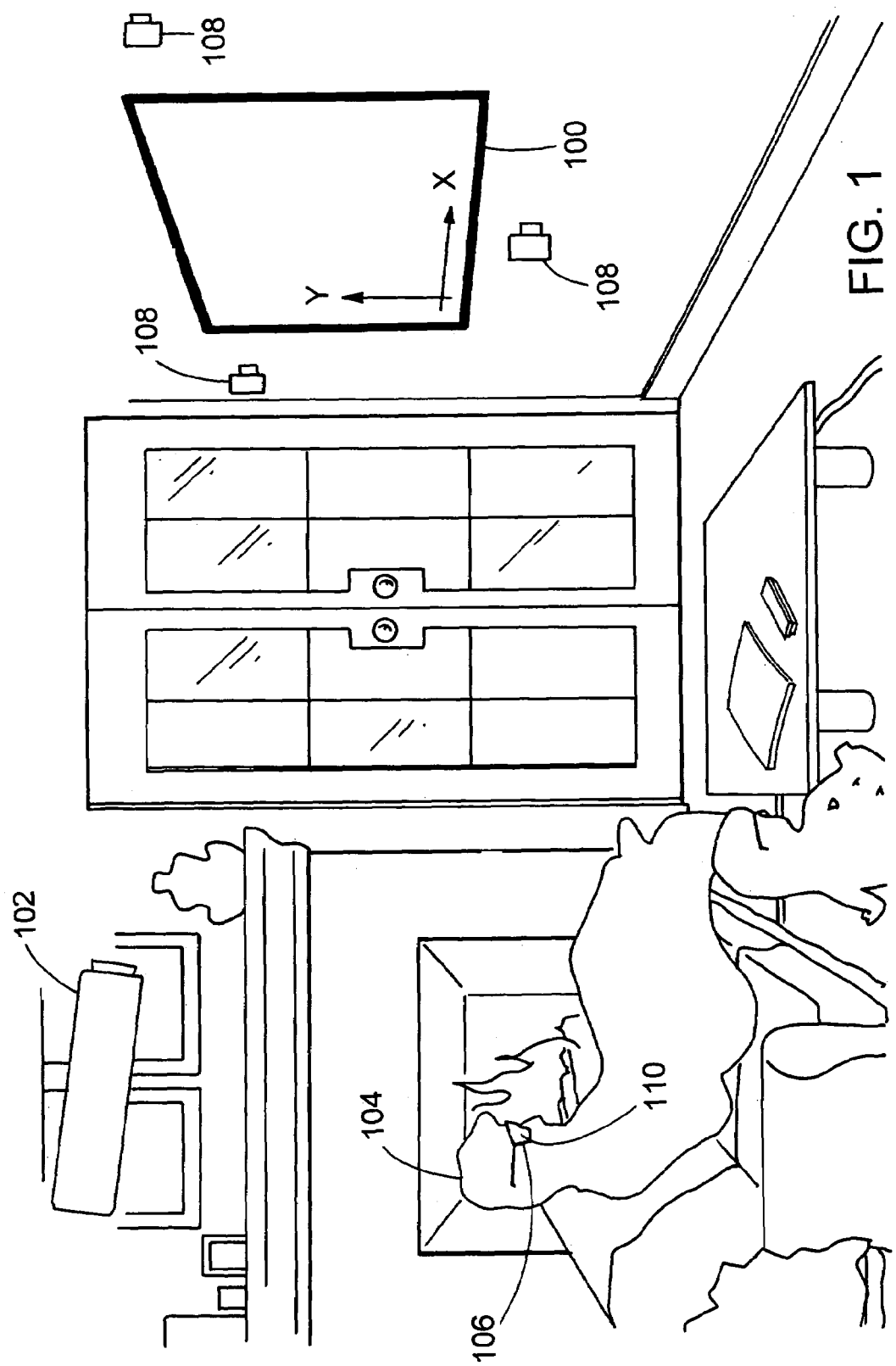

This description relates to display screens.

A projection screen, for example, can be used to view a three dimensional (3D) image by projecting onto the screen two images using light having different polarizations, each image representing the image of a scene as seen from one of the left and right eyes of a hypothetical viewer in front of the scene. A viewer in front of the projection screen wears polarizing eyepieces that allow only one of the two images to pass through to each eye. This allows the viewer's left and right eyes to see the scene from different perspectives, creating an illusion of a 3D scene.

In typical screens the projected light is scattered back into the viewing space and is visible from a range of viewing angles.

SUMMARY

In general, in one aspect, the invention features an assembly to use in a projection screen, the assembly comprising: a metal reflective surface; and a layer above the metal reflective surface to reduce an amount of difference in reflectivity of the metal reflective surface for incident light polarized in two different directions.

Implementations may include one or more of the following features. The layer reduces an amount of difference in reflectivity of the assembly for two polarizations-of light. The layer above the metal reflective surface has a nominal thickness between 50 and 200 nm. The layer above the metal reflective surface has a nominal thickness between 60 and 70 nm or between 170 and 190 nm. The layer above the metal reflective surface comprises at least one of an oxide, silicon oxide, silicon dioxide, or titanium dioxide. The layer comprises a protective layer that is harder than the metal reflective surface. The assembly, measured from a side of the assembly proximate to the protective layer, has a hardness greater than HB using a pencil hardness scale. The metal reflective surface has a thickness less than 200 nm. The metal reflective surface comprises at least one of aluminum, silver, titanium, and niobium. The metal reflective surface covers at least a portion of the assembly that receives a projected image when used in the projection screen. The layer above the metal surface covers more than 50% of the metal reflective surface. The assembly also includes a substrate to support the metal reflective surface. The substrate has surface features such that when surface angles of the substrate surface are measured along a specified direction, the percentage of surface angles in the range of −40 to −20 degrees together with surface angles that are in the range of 20 to 40 degrees is greater than 5%. The surface features have dimensions in a range of 0.5 to 500 μm. The surface features have dimensions in a range of 1 to 100 μm. The percentage of surface angles in the range of −90 to −40 degrees together with surface angles that are in the range of 40 to 90 degrees is less than 5%. The surface features have dimensions in a range of 1 to 100 μm. The layer above the metal reflective surface comprises multiple sublayers. The assembly also includes another layer to improve stain resistance. The layer to improve stain resistance comprises at least one of silicone and fluorocarbon.

In general, in another aspect, the invention features an assembly for use in a projection screen comprising: a metal reflective surface; a protective layer above the metal reflective surface, the protective layer comprising a material and a thickness that reduces depolarization of light reflected from the metal reflective surface; and a substrate to support the metal reflective surface, the metal reflective surface having surface features such that when surface angles of the metal reflective surface are measured along a specified direction, the percentage of surface angles in the range of −40 to −20 degrees together with surface angles that are in the range of 20 to 40 degrees is greater than 5%, the surface features having dimensions in a range of 1 to 100 μm.

Implementations may include one or more of the following features. The combination of the substrate, the metal reflective surface, and the protective layer has a hardness greater than HB using the pencil hardness scale as measured from a surface of the protective layer.

In general, in another aspect, the invention features an apparatus to use in a projection screen, the apparatus comprising: a surface having surface features such that when surface angles of the surface are measured along a specified direction, the percentage of surface angles in the range of −40 to −20 degrees together with surface angles that are in the range of 20 to 40 degrees is greater than 5%, and the percentage of surface angles in the range of −90 to −40 degrees together with surface angles that are in the range of 40 to 90 degrees is less than 5%, the surface having a reflectance greater than 70% for light having a wavelength between 400 nm and 700 nm, the surface features having dimensions smaller than 1 mm, and a substrate to support the surface.

Implementations may include one or more of the following features. The surface features have dimensions in a range of 1 to 100 μm. There is also a substrate to support the surface. The substrate comprises plastic or a polymeric coating on plastic. The surface comprises a metal reflective surface. The percentage of surface angles in the range of −40 to −20 degrees together with surface angles that are in the range of 20 to 40 degrees is greater than 10%. The percentage of surface angles in the range of −90 to −40 degrees together with surface angles that are in the range of 40 to 90 degrees is less than 2.5%. The percentage of surface angles in the range of −90 to −50 degrees together with surface angles that are in the range of 50 to 90 degrees is less than 3%. The reflectance of the apparatus is greater than 50% for viewing angles between −32 to 32 degrees.

In general, in another aspect, the invention features an apparatus comprising: a projection screen having a metal reflective surface and a silicon oxide protective layer above the reflective surface.

Implementations may include one or more of the following features. The silicon oxide protective layer has a nominal thickness in a range of 50 to 200 nm.

In general, in another aspect, the invention features a method for producing a assembly for use in a projection screen, comprising: providing a metal reflective surface; and placing a layer above the metal reflective surface to reduce an amount of difference in reflectivity of the assembly for two modes of polarized light.

Implementations may include one or more of the following features. The two modes of polarized light comprise a first mode in which light is linearly polarized along a first direction and a second mode in which light is linearly polarized along a second direction, the second direction being perpendicular to the first direction. The layer above the metal reflective surface comprises a protective layer that is harder than the metal reflective surface assembly. Another layer is placed on the protective layer to improve stain resistance. The additional layer also improves resistance to cleaning solvents. An image is projected on a projection screen having surface features and coatings configured such that the reflectance of the surface of the projection screen is greater than 50% for horizontal viewing angles between −32 and 32 degrees, as compared to the reflectance at zero degree, and the amount of depolarization is less than 1%. The surface features are configured such that when surface angles of the surface are measured along a specified direction, the percentage of surface angles in the range of −40 to −20 degrees together with surface angles that are in the range of 20 to 40 degrees is greater than 5% and the percentage of surface angles in the range of −90 to −40 degrees together with surface angles that are in the range of 40 to 90 is less than 5%. The surface features have dimensions in a range of 1 to 100 μm.

Other features and advantages of the invention will be apparent from the description and from the claims.

DESCRIPTION

Figure 2:
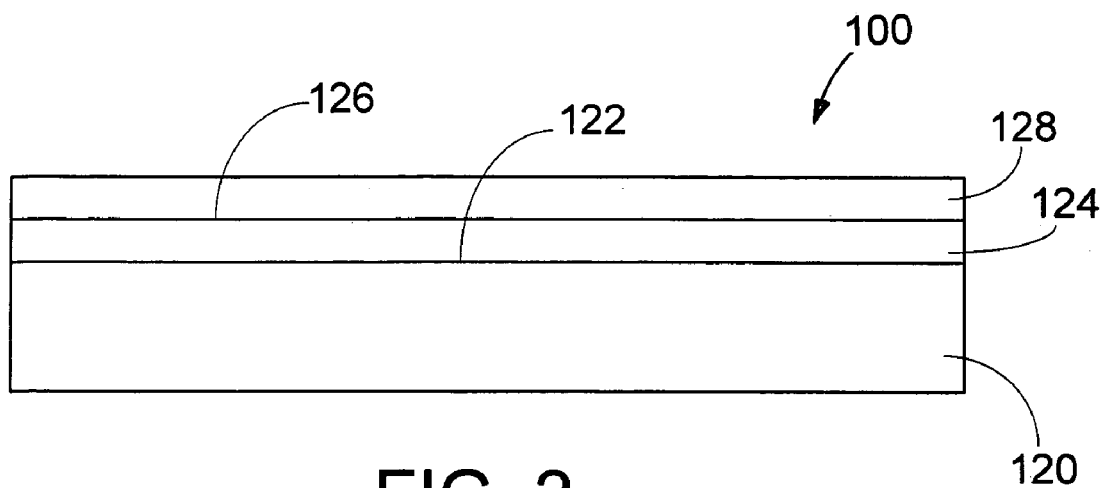
Figure 4:
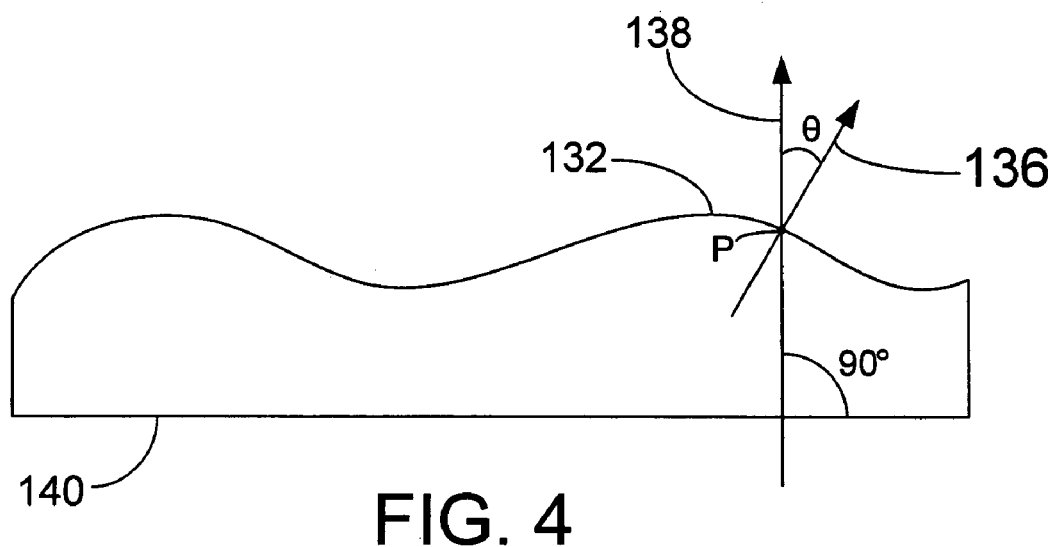
Figure 3:
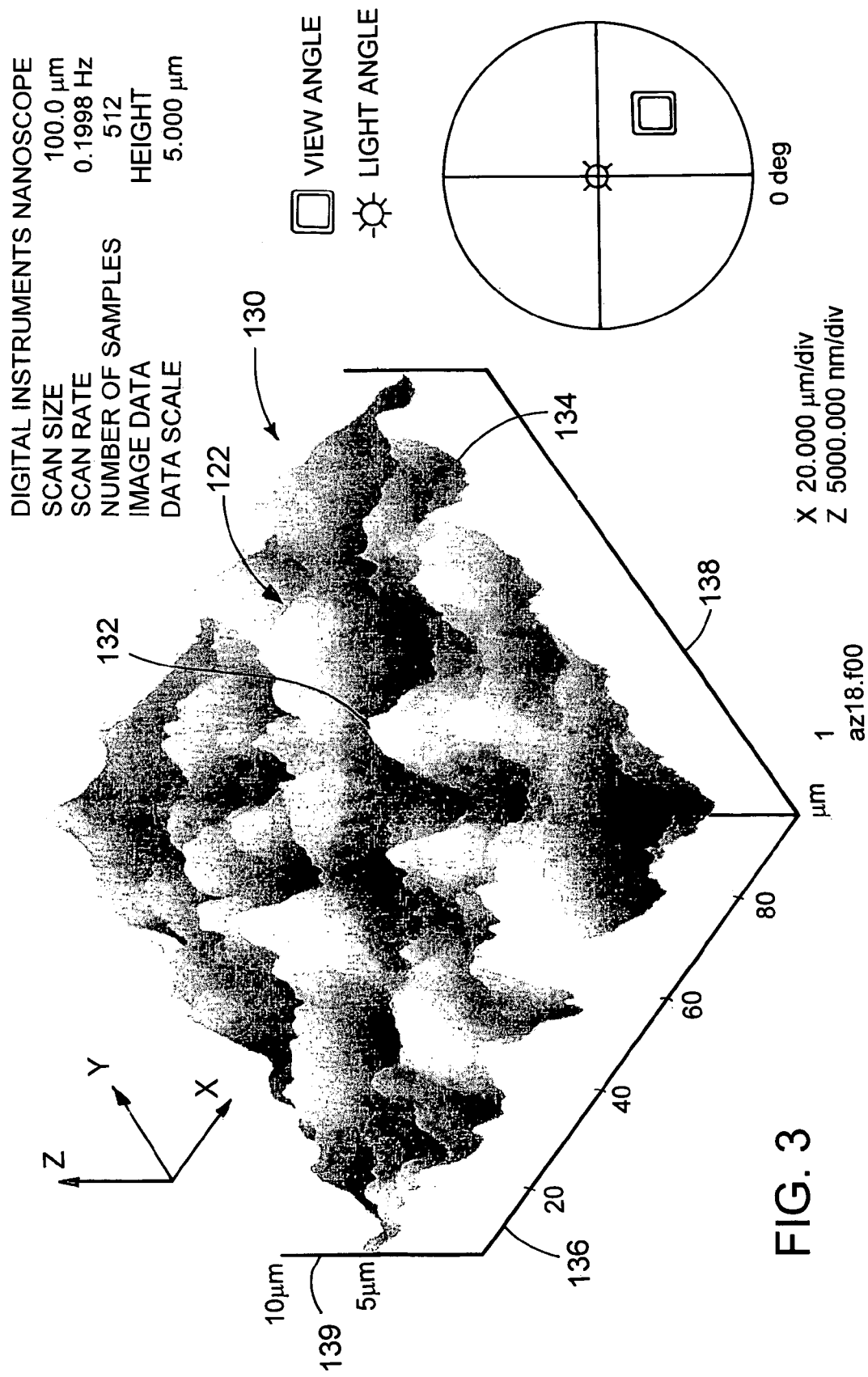
Figure 5:
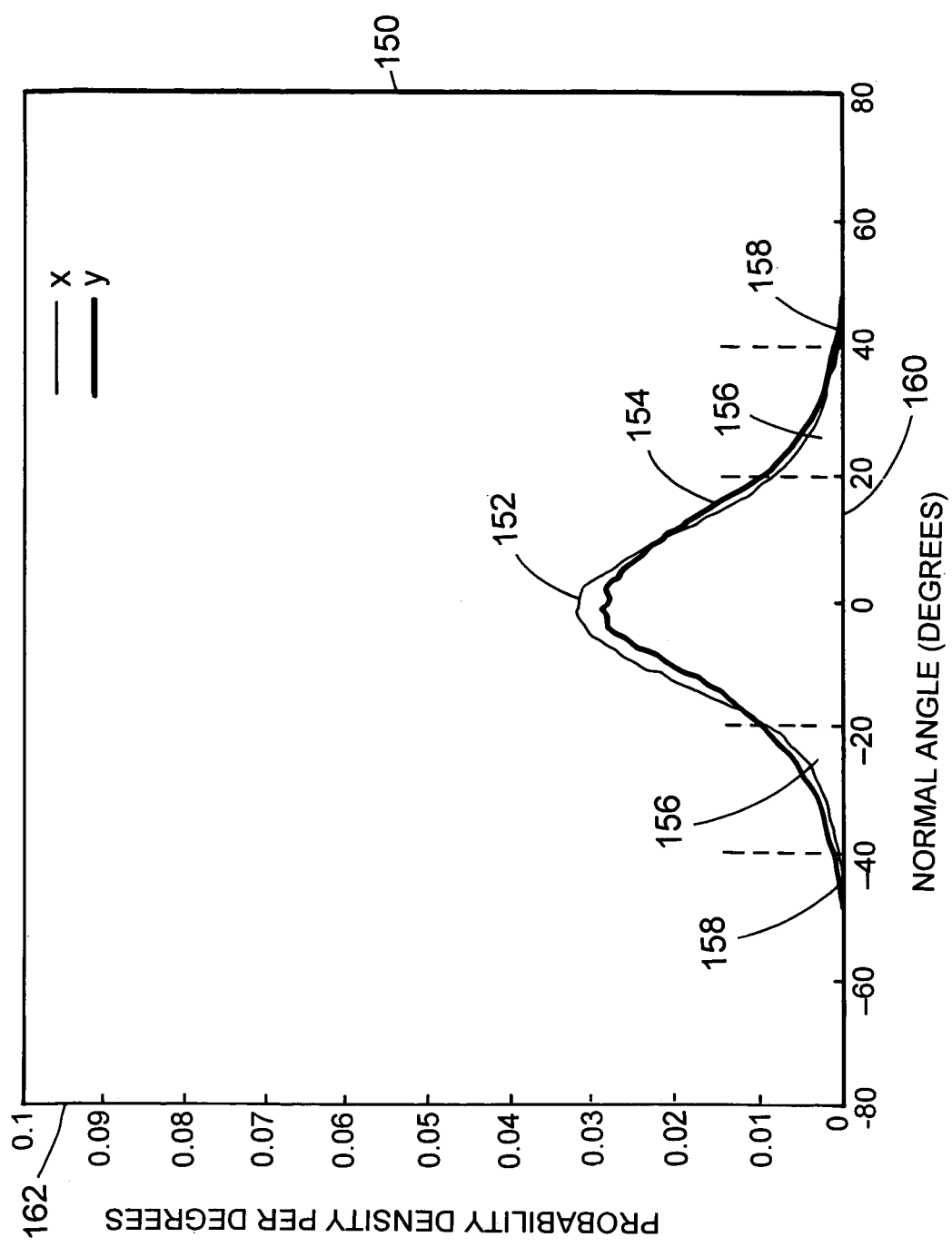
Figure 6:
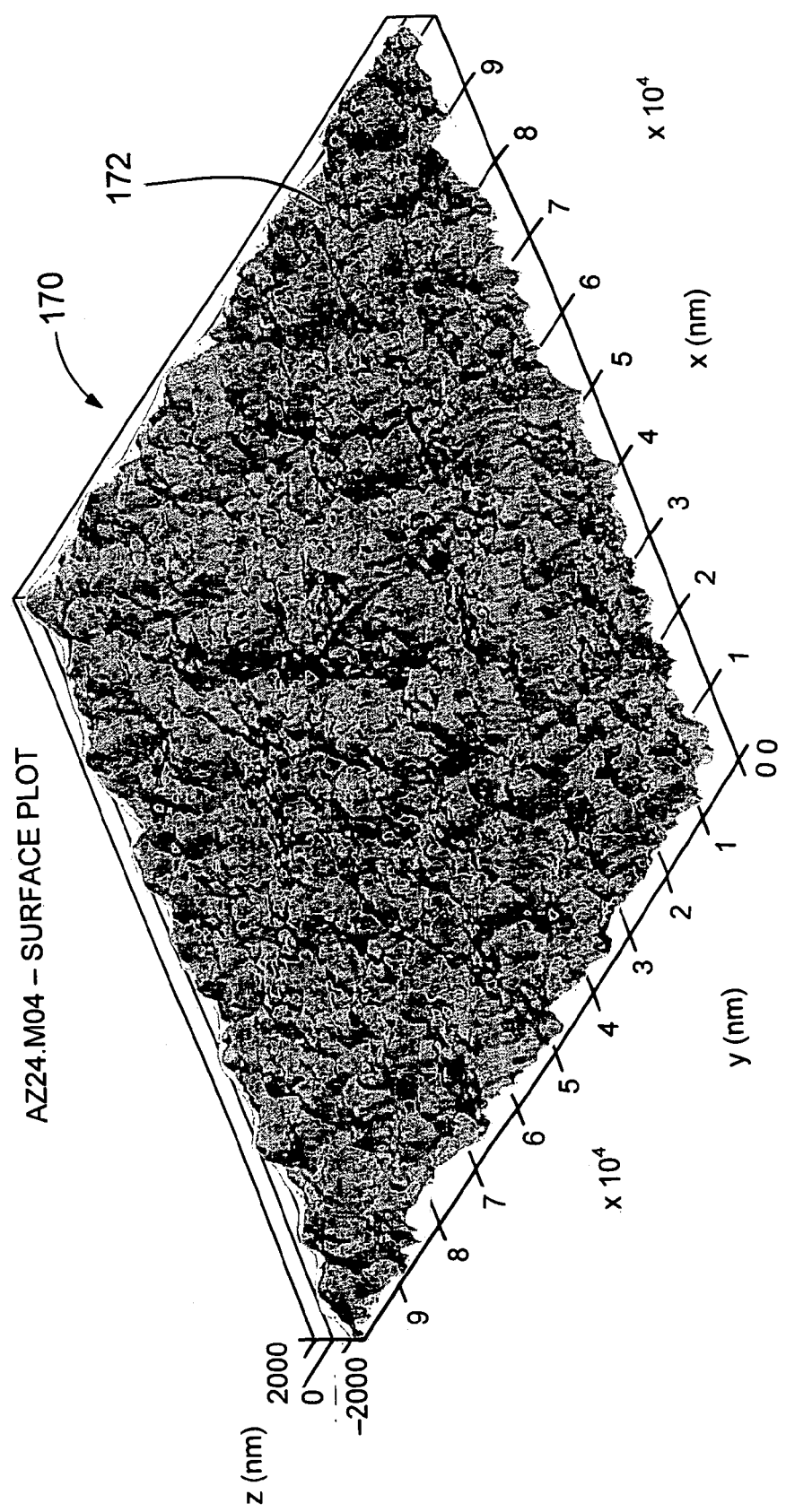
Figure 7:
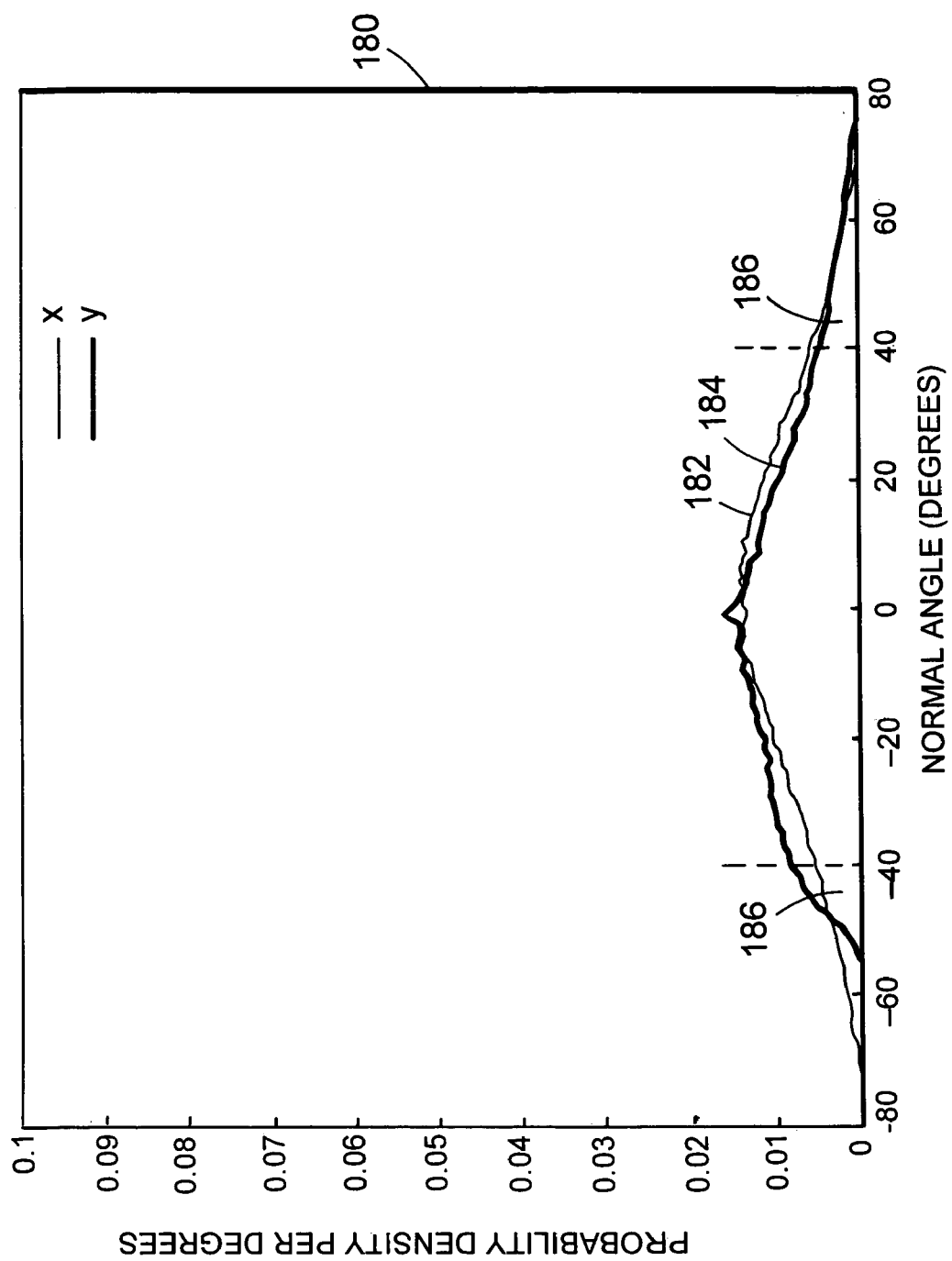
Figure 8:
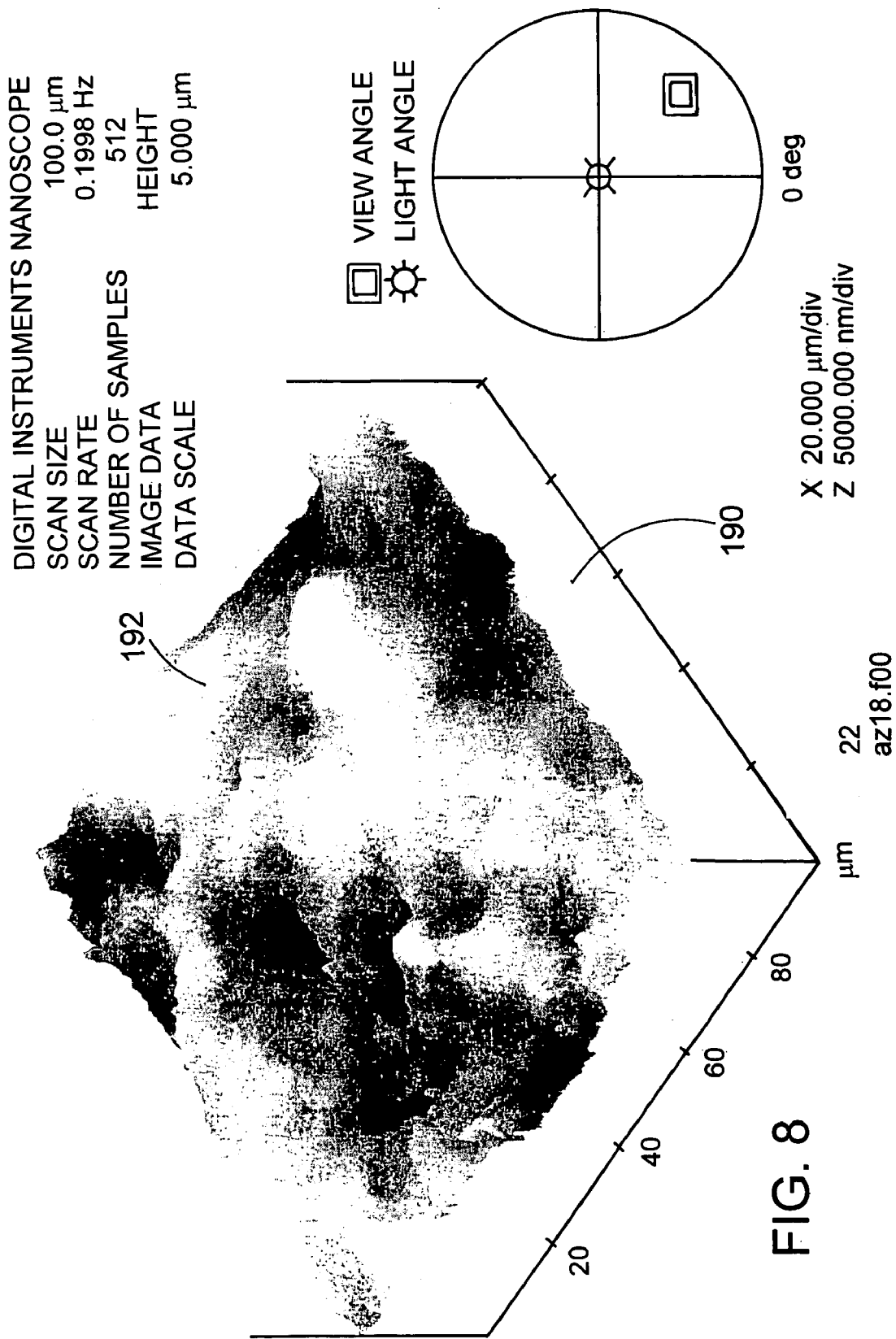
Figure 9:
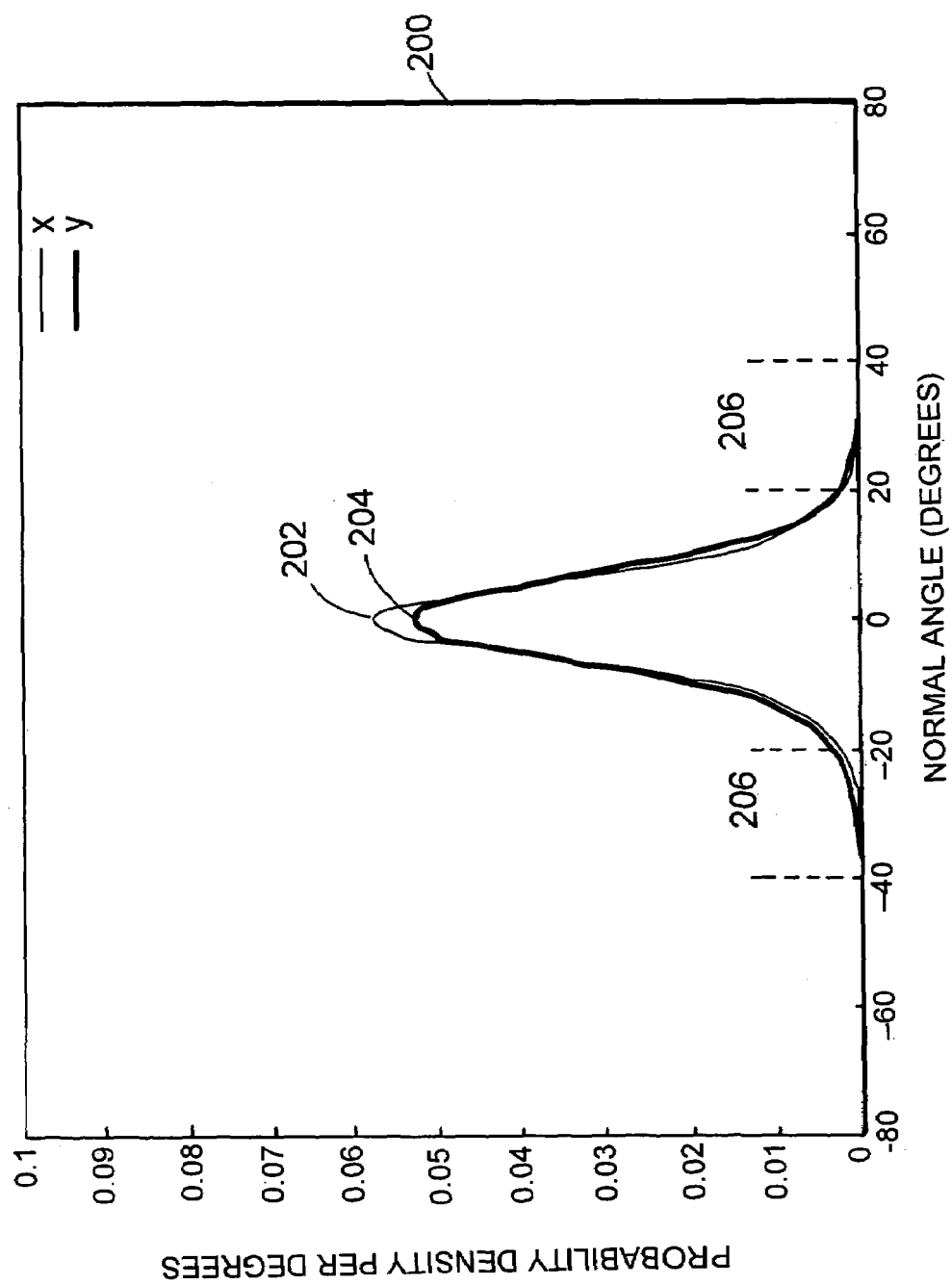
Figure 10:
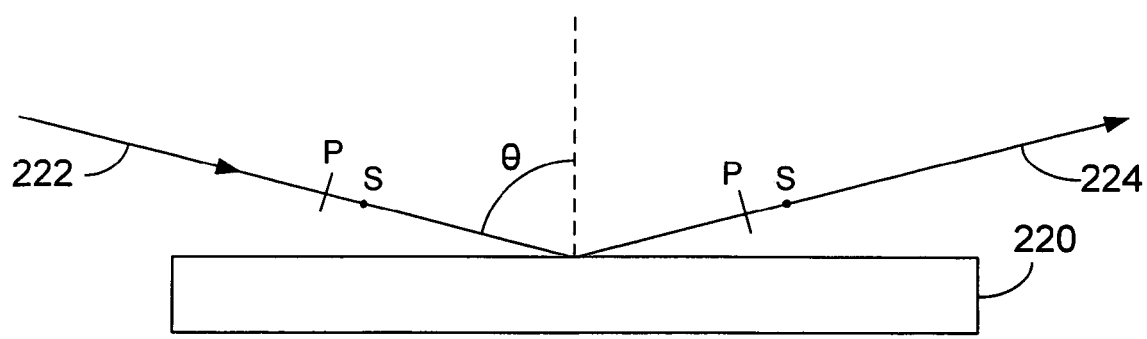
Figure 12:
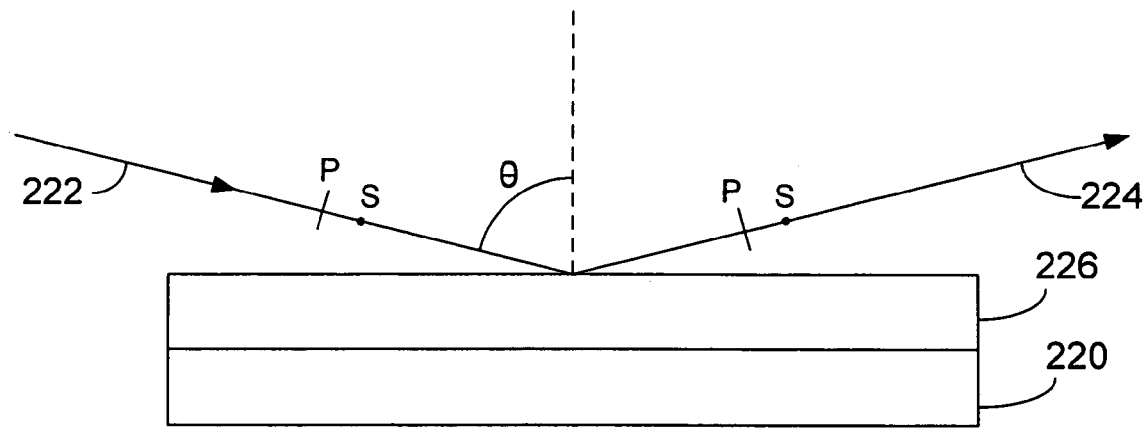
Figure 11:
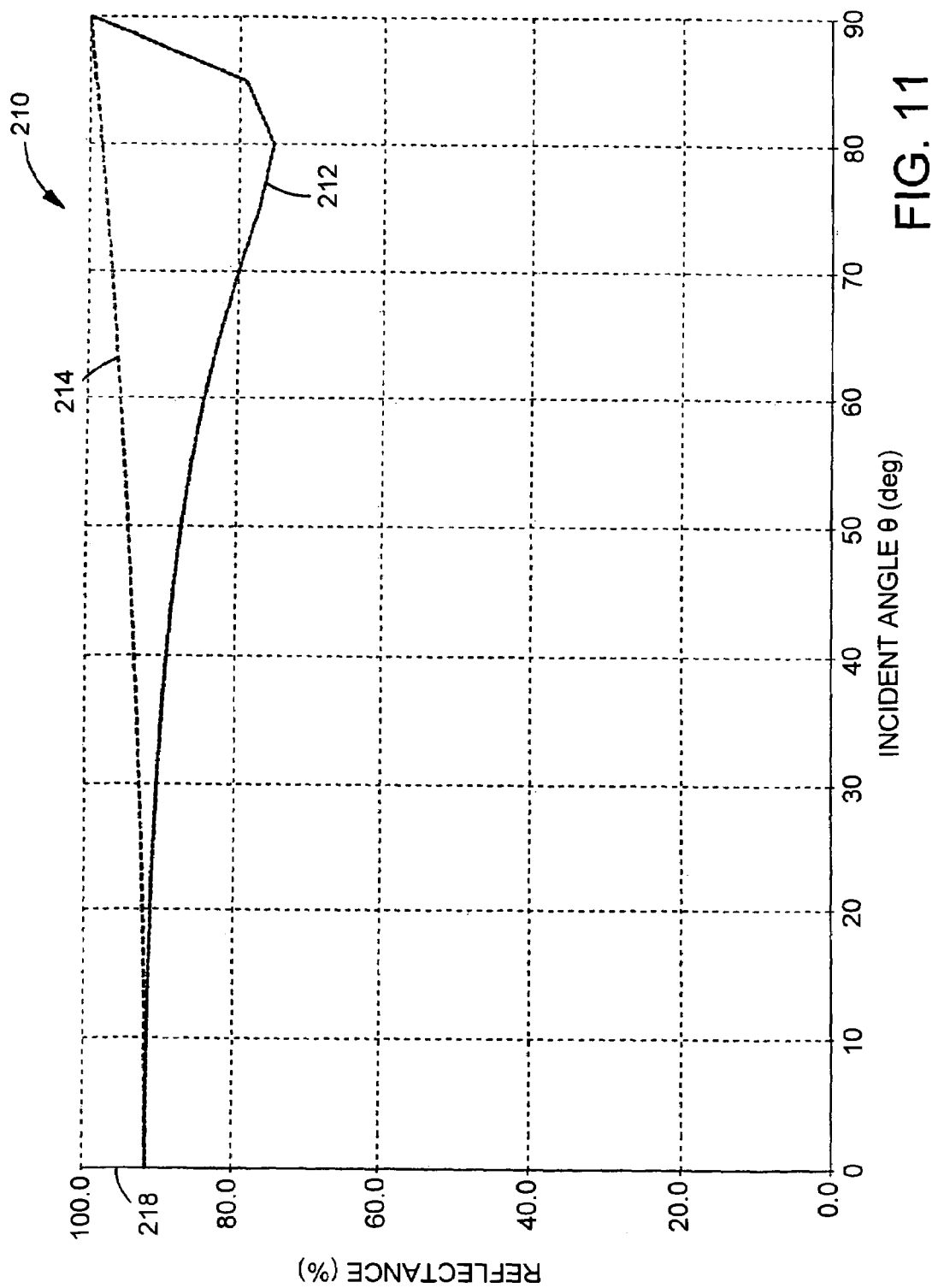
Figure 13:
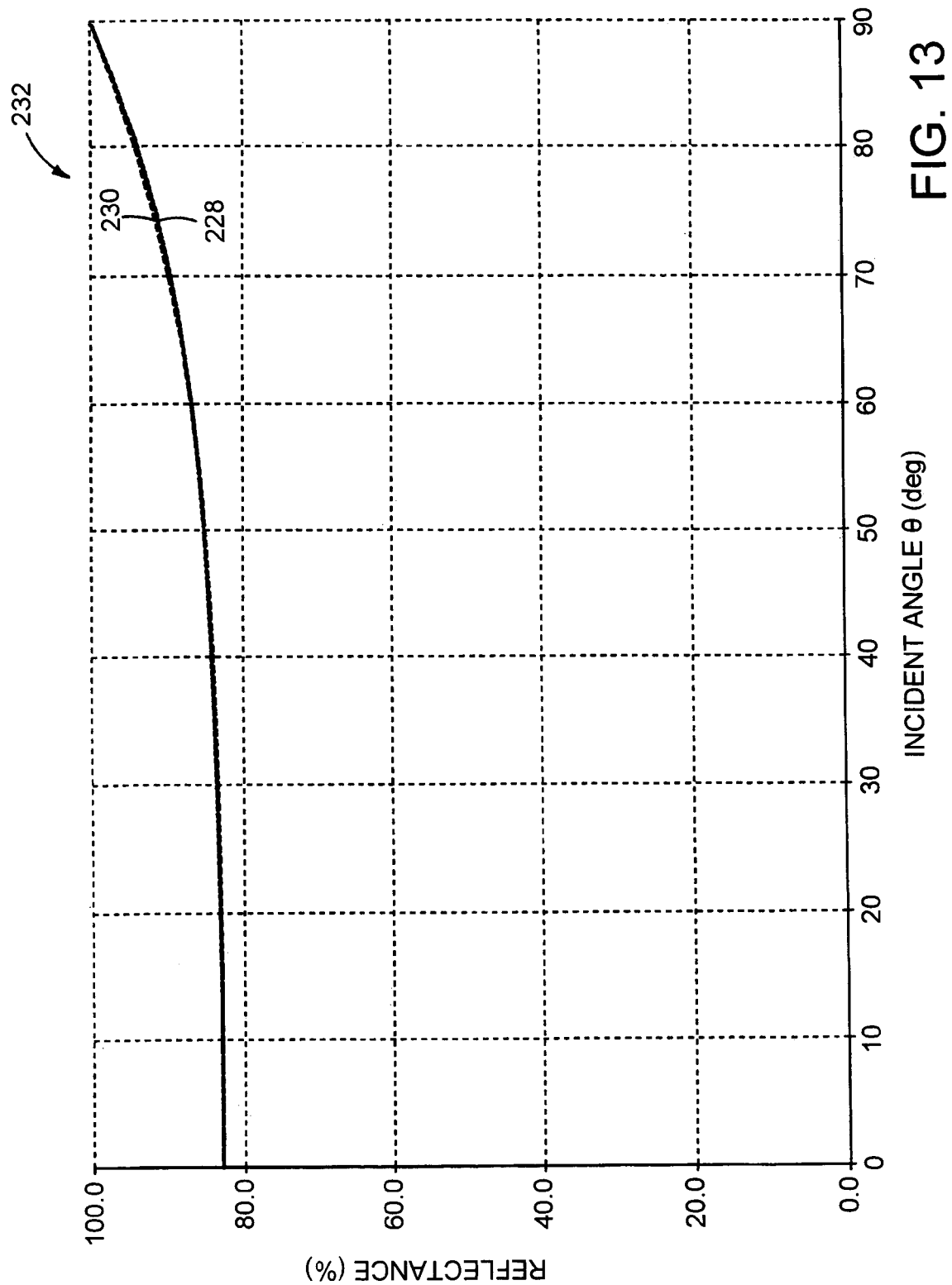
Figure 14:
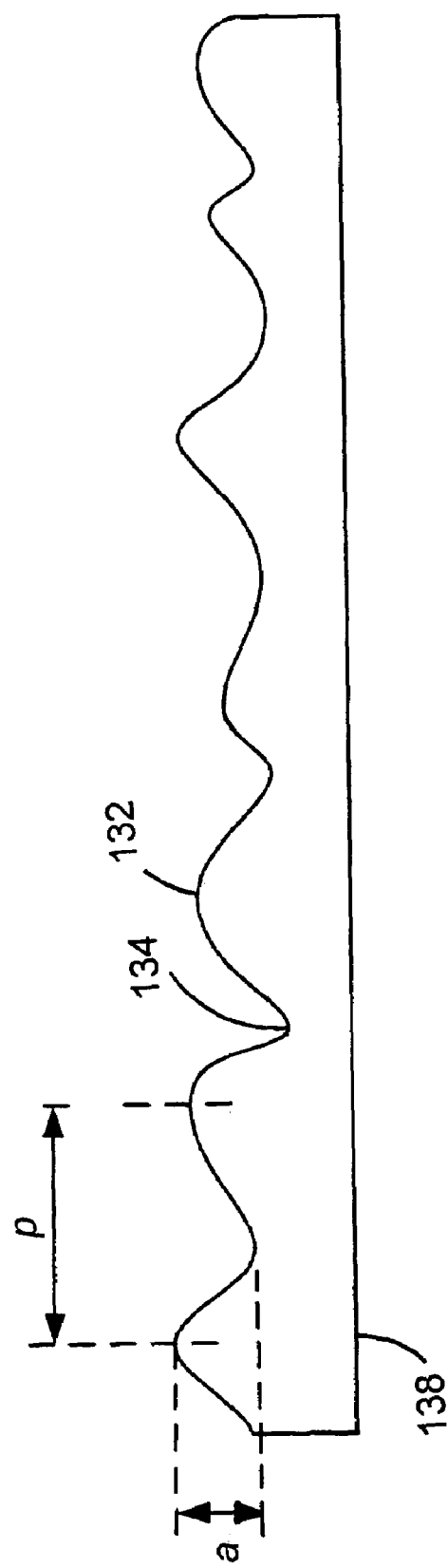
Figure 15:
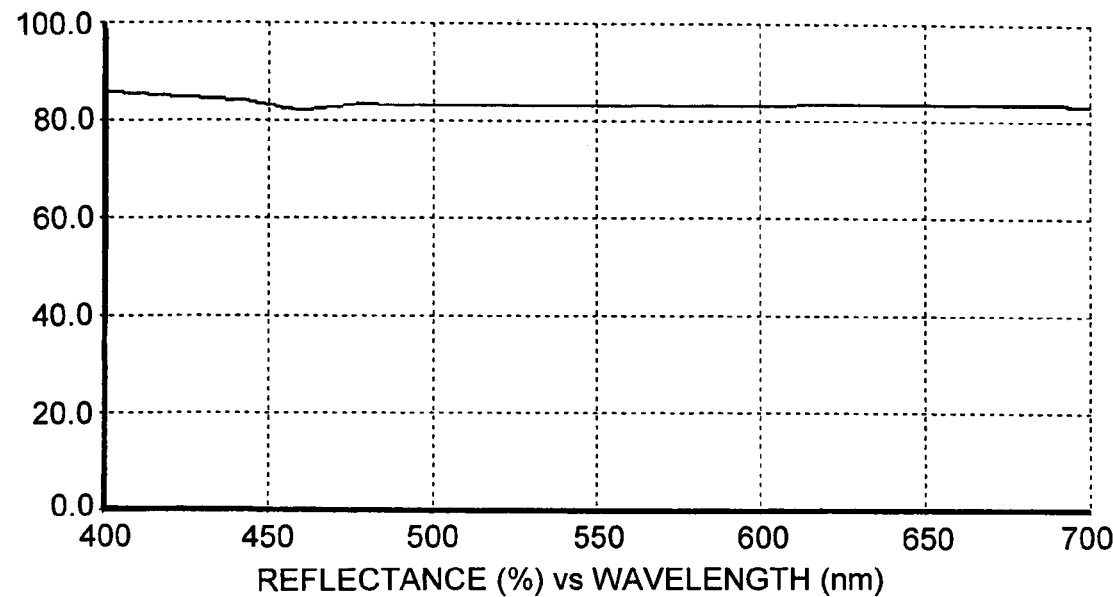
Figure 16:
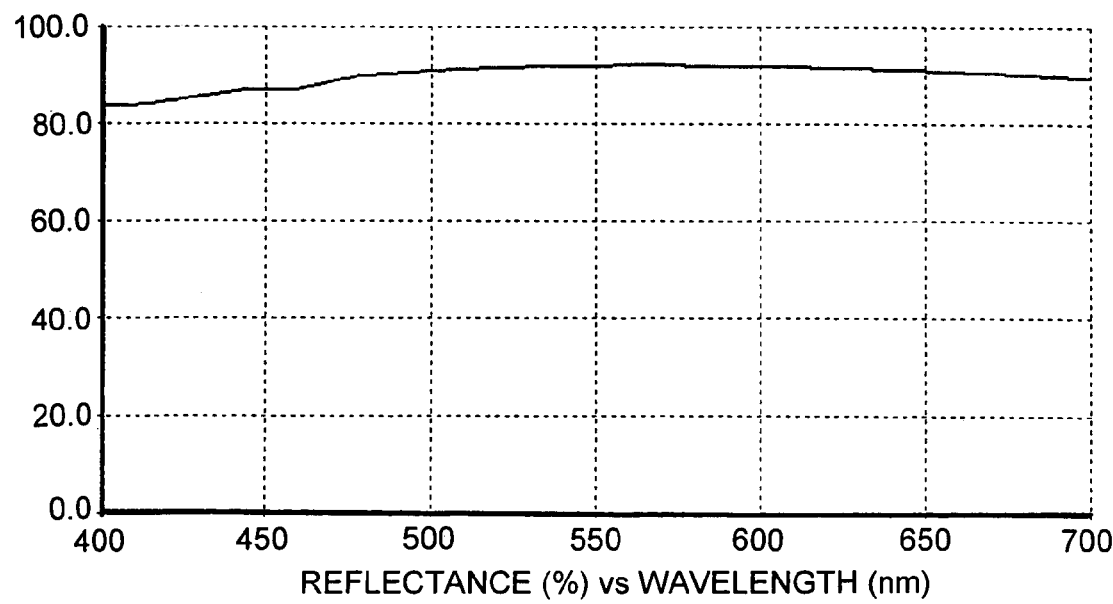
Figure 17:
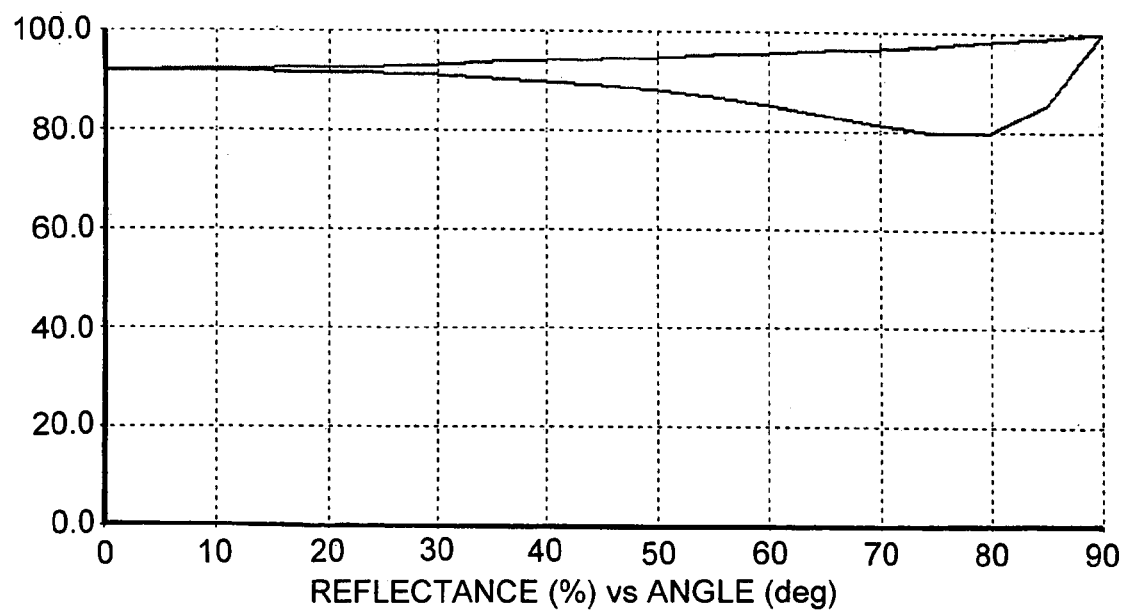

FIG. 1 shows a projection screen used in a room.
FIG. 2 shows a schematic side view of the screen.
FIGS. 3, 6, and 8 are micrographs.
FIG. 4 shows a surface bump.
FIGS. 5, 7, and 9 show probability density plots.
FIGS. 10 and 12 show light reflecting from surfaces.
FIGS. 11 and 13 show reflectances of s- and p-polarized light.
FIG. 14 is a schematic side view of a screen.
FIGS. 15 and 16 show spectral curves.
FIG. 17 shows polarization splitting curves.

As shown in FIG. 1, a projection screen 100 is suitable for viewing 2D and 3D images (or video, which is a series of images). To view 3D images, a projector 102 projects images intended for the left eye using light polarized in a first direction (e.g., the polarization vector can be tilted 45 degrees counter-clockwise from vertical), and projects related images intended for the right eye using light polarized in a second direction (e.g., the polarization vector can be tilted 45 degrees clockwise from vertical). A viewer 104 sitting in front of the screen 100 wears goggles 106 having polarizing eyepieces 110 that allow the viewer's left and right eyes to see the images intended for the left and right eyes, respectively, and not see the images intended for the right and left eyes, respectively. A set of front speakers 108 and rear surround speakers (not shown) provide surround sound effects. The projection screen 100 has surface features (described below) that allow the screen to achieve both a wide viewing angle and accurate 3D images.

As shown in FIG. 2, in some examples, the projection screen 100 includes a substrate 120 having a matte surface 122. In one case, the substrate 120 is a product called Rosco 116 or 3026, commercially available from Rosco Laboratories Inc., Stamford, Conn. The substrate may be a plastic or a polymeric coating on plastic, for example. A reflective layer 124 of aluminum about 50 nm thick is sputtered on the substrate 120. The metal may be sputtered over all of the substrate that makes up the screen or only over a portion of the substrate. Because the reflective layer 124 is thin, the surface 126 of the reflective layer 124 will generally conform to the surface 122 and have similar surface features. In the example, the reflective layer 124 reflects more than 80% of incident light in the visible spectrum (primarily from 400 nm to 700 nm), the rest being absorbed. It may be possible, alternatively, to form a reflective layer that has a desired configuration of surface features but does not conform to the surface of the substrate.

A protective layer 128 of silicon oxide with a nominal thickness of between about 50 to 200 nm thick is deposited above the reflective layer 124. By nominal thickness we mean the thickness on a smooth substrate that is coated simultaneously as the coating is done on a rough substrate. The actual thickness of the coating on the rough substrate would vary with location and the average thickness on the rough substrate would be less than the nominal thickness. The protective layer 128 is harder than the reflective layer 124 and can reduce the occurrence of scratch marks on the reflective layer. For example, the hardness of an aluminum reflective layer on a Rosco 3026 substrate may be less than 6B (using a pencil hardness scale), while the hardness of the aluminum reflective layer with the protective layer on a Rosco 3026 substrate may be F. The hardnesses of the reflective layer and the protective layer in other examples may be different. As described below, the silicon oxide protective layer 128 also reduces depolarization, resulting in sharper 3D images.

The three-dimensional graph 130 shown in FIG. 3 is generated from a surface scan of a portion of the projection screen 100 by using an atomic force microscope (Digital Instruments Nanoscope). The z-axis 139 represents the height of a point on the surface 122 at particular coordinates on the x-axis 136 and y-axis 138. The scan area was 100-by-100 square micrometers, and the number of points measured was 512 in both the x- and y-directions. The surface 122 has "bumps" 132 and "crevices" 134 with surfaces at various angles that cause light to diffusely reflect in different directions.

As shown in FIG. 4, an example of a bump 132 is shown above a reference plane 140 of the substrate 120 (the reference plane may be at the bottom surface of the substrate, for example). During use, the projection screen 100 may appear planar but rough, as depicted in FIG. 1, or may be curved (and rough), as when used in a dome theater. The reference plane 140 represents the plane of the substrate 120 at a localized region in which the curvature of the screen is small. A surface angle at a point P of the surface 122 is defined as the angle θ between a surface normal vector 136 and a vector 138 normal to the reference plane 140. In some examples, more than 5% of the surface 122 has surface angles whose absolute values are in the range of 20 to 40 degrees, and less than 5% of the surface 122 has surface angles whose absolute values are in the range of 40 to 90 degrees.

In FIG. 5, graph 150 shows the probability density of surface angles measured on the surface 122. Graph 150 is derived from the atomic force microscopy scan shown in FIG. 3. The horizontal axis 160 represents surface angles, and the vertical axis 162 represents probability densities per degree. Curves 152 and 154 represent the probability densities of the surface angles measured along the x and y direction, respectively.

If the total area below the curve 152 (or 154) is normalized to be 1 for surface 122, the area 156 below the curve 152 (or 154) for angles in the range of −40 to −20 degrees together with angles in the range of 20 to 40 degrees is greater than 0.05, and the area 158 below the curve 152 (or 154) for angles in the range of −90 to −40 degrees together with angles in the range of 40 to 90 degrees is less than 0.05. Because the amount of surface area having surface angles in the range of −40 to −20 degrees together with surface angles in the range of 20 to 40 degrees is greater than 5% of the total surface area, the projection screen 100 can achieve a wider viewing angle in which the light intensity is above a certain threshold (such as 50% of the intensity that exists at 0 degrees viewing angle).

At the same time, for surface 122, the amount of surface area having surface angles in the range of −90 to −40 degrees together with surface angles in the range of 40 to 90 degrees is kept below 5% of the total surface area in order to reduce the amount of depolarization. Depolarization occurs when an s-polarized incident light beam, after reflection, contains a p-polarized component (or a p-polarized incident light beam, after reflection, contains an s-polarized component). S-polarized light refers to light that is polarized in a direction perpendicular to the plane of incidence, and the p-polarized light refers to light that is polarized in a direction parallel to the plane of incidence. The plane of incidence is defined as the plane that includes both the incoming light ray and the reflected light ray. The surface regions having surface angles in the range of −90 to −40 degrees or 40 to 90 degrees tend to cause depolarization because there is a relatively large difference in reflectance for s- and p-polarized light. Although, in the example, we refer to s- and p-polarized light, in other examples the polarizations could be different.

When the projector 102 projects an image using light polarized in a particular direction, such as having the polarization vector tilted 45 degrees clockwise from vertical, the light that is incident upon a tilted surface of a bump on the screen 100 may have both s- and p-polarization components (because the light is not entirely parallel or perpendicular to the plane of incidence) relative to the surface at the point of incidence. If the reflectances for s- and p-polarized light are the same, then the s- and p-polarized components of the reflected light in combination will produce a reflected light having polarization vector the same as the incoming light. However, if the reflectances for the s- and p-polarized light are different, then the s- and p-polarized components of the reflected light in combination produce a reflected light having a polarization vector different than the incoming light.

Surface 122 has surface features the dimensions of which are mostly in the range of 1 micrometer (μm) to 100 μm to produce diffuse reflection without scatter, thereby having large viewing angles without significant depolarization. Assuming the surface 122 is placed horizontally, the dimensions of the surface features refer to the sizes of bumps (or crevices), represented by a horizontal distance "p" between the peaks of adjacent bumps (as shown in FIG. 14). The surface features are mostly smaller than 100 μm so that there is no (or a negligible amount of) visible spots on the screen. The surface features are mostly larger than 1 μm (which is larger than the wavelength of visible light) to prevent optical scatter, which tends to cause depolarization. The surface 122 has a vertical distance "a" between a peak and an adjacent crevice (see FIG. 14) that is also in the range of 1 to 100 μm. Gravure printing may be used to make diffuse surfaces having surface features in the range of 1 to 100 μm. Abrasion may also be used to produce diffuse surfaces, although abrasion tends to result in a larger percentage of small surface features (smaller than 1 μm) that produce optical scatter.

Depolarization affects the clarity of the 3D images because an image intended for the left eye may be partially seen by the right eye, and vice versa, resulting in ghost images. By keeping the amount of surface area having surface angles in the range of −90 to −40 degrees together with surface angles in the range of 40 to 90 degrees below 5% of the total surface area, ghost images can be reduced to a level that is not readily discernible to the viewer 104.

The tradeoff between reduced depolarization and wider viewing angle may be struck by various selected percentages of surface angles that are within the ranges mentioned above. The surface 122 may be configured in a variety of ways to meet the selected percentages. While a particular substrate material has been used in the example, other substrate materials may achieve the selected percentages using other surface irregularities and distributions of the irregularities.

However, at least some projection screen surfaces that have properties that are different from those of the surface 122 of the projection screen 100 may not achieve all of the benefits of screen 100.

FIGS. 6 and 7, for example, depict graphs that are derived from measurements of a screen surface that has more surface area with larger surface angles than the surface 122. FIGS. 8 and 9, on the other hand, depict graphs that are derived from measurements of a screen surface that has less surface area with large surface angles than the surface 122.

The graph 170 of FIG. 6 (generated from an atomic force microscopy surface scan) represents a surface 172 in which the amount of surface area having surface angles in the range of −90 to −40 degrees together with surface angles in the range of 40 to 90 degrees is greater than that of the surface 122 of the projection screen 100. In FIG. 7, a graph 180 shows the probability density of surface angles measured across the surface 172 (FIG. 6). Curves 182 and 184 represent the probability densities of the surface angles measured along the x and y direction, respectively. A comparison of curves 182 and 184 to curves 152 and 154 (FIG. 3) shows that a larger percentage of the surface area of the surface 172 (in this case approximately 10 percent) has surface angles that are in the range of −90 to −40 degrees or 40 to 90 degrees (represented by the area 186 under the curve 182 or 184) compared to the screen of FIGS. 4 and 5. While this results in a better viewing angle (because more light is diffused to wider angles), the amount of depolarization is also greater, resulting in ghost images that degrade the 3D effect of the screen.

The graph 190 (generated from an atomic force microscopy surface scan) of FIG. 8 represents a surface 192 in which the percentage of surface area having surface angles in the range of −40 to −20 degrees together with surface angles in the range of 20 to 40 degrees is less than that of the surface 122 of the projection screen 100. The graph 200 of FIG. 9 shows the probability density of surface angles measured across the surface 192. Curves 202 and 204 represent the probability densities of the surface angles measured along the x and y direction, respectively. A comparison of curves 202 and 204 to curves 152 and 154 (FIG. 3) shows that a smaller percentage of the surface area of the surface 192 (in this case approximately 2 percent) has surface angles in the range of −40 to −20 degrees or 20 to 40 degrees (represented by the area 206 under the curve 202 or 204). This results in a smaller amount of depolarization (compared to surface 172) because when projected light is reflected from the surface, the incident angles are smaller on average. The viewing angle is reduced, however, because a larger percentage of the projected light is reflected within a narrower range of angles, thereby limiting the range of locations from which a viewer can adequately view an evenly illuminated 3D image on the screen. This may result in a "hot spot" where the center of the image is very bright and the edges are relatively dim.

Referring to FIG. 10, when incident light 222 having s and p-polarized components is reflected from the surface of an aluminum layer 220, the reflectance of the s and p-polarized components may be different for different incident angles θ. The s-polarized component is represented by a dot, and the p-polarized component is represented by a line segment. Referring to FIG. 11, a graph 210 includes curves 212 and 214 that represent a simulation of the reflectances of s and p-polarized light, respectively, at different incident angles θ when the light is reflected from a smooth surface of the aluminum layer 220. The simulation was performed using TFCalc software from Software Spectra, Inc., Portland, Oreg. The wavelength of the light in the simulation is 550 nm. When the incident angle θ is small, the reflectance of s- and p-polarized components are similar. However, as the incident angle θ increases, the difference in reflectance also increases. When the incident angle θ is about 80 degrees, the difference in reflectance can be greater than 15%. This difference (called polarization splitting) can cause depolarization, resulting in ghost images.

The difference in reflectances of the s and p-polarized components can be reduced by applying a thin layer of silicon oxide (SiO) 226 to the reflective aluminum layer 220, as shown in FIG. 12. SiO is effective because it has an index-of-refraction (n=1.55) that is able to work well with aluminum in preventing polarization splitting. Referring to FIG. 13, a graph 232 includes curves 228 and 230 that represent a simulation of the reflectances of s- and p-polarized light, respectively, at different incident angles θ when the light is reflected off the silicon oxide and aluminum layers 226 and 220. The wavelength of the light is 550 nm, the thickness of the silicon oxide layer 226 is 67 nm, and the thickness of the aluminum layer is greater than about 50 nm. Curves 228 and 232 substantially overlap, meaning that the depolarization will be reduced even to the point of being negligible. FIG. 15 is a spectral curve for the same combination of layers at zero degrees angle of incidence.

In another simulation, a layer of silicon oxide having a thickness of 180 nm was also shown to reduce depolarization while increasing the reflection of visible light. FIG. 16 shows a spectral curve for 180 nm silicon oxide on 50 nm aluminum at zero degrees angle of incidence. FIG. 17 shows polarization splitting curves for that combination of layers at a wavelength of 550 nm.

In FIG. 12, light 222 is shown to reflect off the surface of the silicon oxide layer. Because silicon oxide is transparent to visible light, light 222 actually interacts with both the silicon oxide layer 226 and the aluminum layer 220 before the light is reflected.

Using a single layer of silicon oxide having a particular thickness can effectively reduce the depolarization of light having a particular wavelength (or a narrow range of wavelengths), but is less effective at other wavelengths. Multi-layer coatings can be used to reduce the depolarization for a wider range of wavelengths.

Additional information concerning coatings and layers of projection screens is set forth in U.S. patent application Ser. NO. 10/789,695, filed on the same day as this application, entitled Selective Reflecting and incorporated by reference here in its entirety.

Although the simulations shown in FIGS. 11 and 13 were based on surfaces of the aluminum layer 220 and the silicon oxide layer 226 being smooth, the reduction in reflectance difference of the s- and p-polarized components due to the silicon oxide layer 226 would occur even if the surfaces were rough, as in the surface 122 shown in FIG. 3. The calculations for a smooth surface can represent a small section of a bump as long as the bump is fairly smooth on a much smaller scale.

For a projection screen used in a typical living room, it is useful for the surface of the projection screen to have a hardness greater than "HB" (based on the pencil hardness scale) to reduce scratch marks. The silicon oxide protective layer 128, for example, achieves a hardness of "F".

To achieve an acceptably wide viewing angle for home theater applications, the intensity of reflected light at viewing angles from −32 to 32 degrees, in some examples, is greater than 50% of the intensity of the reflected light when viewed directly (i.e., when the viewing angle is zero). The surface 122 may be designed so that the reflected light intensity at a 32-degree viewing angle is, in some examples, about 65% of the reflected light intensity when viewed directly.

Conversely, it is useful to keep the amount of depolarization below 1%. The depolarization can be measured as follows. An image is projected on the screen using light having a vertical polarization. A linear polarizer, aligned vertically, is placed in front of a detector. The detector measures the intensity $I_1$ of the reflected light that passes through the vertically aligned polarizer. The linear polarizer is then rotated 90 degrees so that it is aligned horizontally. The detector measures the intensity I2 of the reflected light that passes through the horizontally aligned polarizer. The ratio $I_2/I_1$ represents the amount of depolarization. The construction that includes the silicon oxide protective layer 128 on an aluminum reflective layer on a Rosco 3026 substrate can reduce the amount of depolarization to 0.79%. The depolarization is not a strong function of the wavelength.

Table 1 summarizes the properties of three projection screens: projection screen 100, projection screen A, and projection screen B. Projection screens A and B are examples of commercially available screens designed for 3D images. For projection screen 100, the reflective layer 124 has a surface profile shown in FIG. 3. Screen 100 includes a silicon oxide protective layer 128 above the reflective layer. The silicon oxide protective layer 128 has a nominal thickness of 134 nm, though the thickness may be less on areas with higher surface angles. The projection screen A has a metal-based reflective surface having a profile shown in FIG. 8, and does not have a protective coating above the reflective surface. The projection screen B has a metal-based reflective surface, and does not have a protective coating above the reflective surface.

TABLE 1

| Projection screen | Viewing angle (% at 32 degrees) | Depolarization (%) | Hardness (pencil hardness scale) |
|---|---|---|---|
| Screen 100 | 65 | 0.79 | F |
| Screen A | 32 | 0.66 | less than 6 B |
| Screen B | 33 | 2.35 | 2 H |

Table 1 shows that projection screen 100 has a wider viewing angle and not substantially higher depolarization than projection screens A and B. Screen 100 also has an acceptable hardness of F.

A coating of silicone or fluorocarbon can be added above the protective layer 128 of the projection screen 100 to improve stain resistance. The coating can be thin, such as having a thickness of approximately 1 to 5 nm, so that it does not significantly affect the optical properties of the projection screen 100. The silicone or fluorocarbon layer prevents contamination from entering the fine pores of the coatings, and allows the surface of the projection screen 100 to be cleaned more easily.

Although some examples have been discussed above, other implementations and applications are also within the scope of the following claims.

More complex optical coatings can be designed to minimize the S and P splitting over a defined range of visible wavelengths. For example, the following design achieves a local minimum of S and P splitting over the 500 to 600 mm region.

| Layer | Material | Thickness (nm) |
|---|---|---|
| 1 | Aluminum | 50.0 |
| 2 | SiO2 | 107.1 |
| 3 | TiO2 | 62.2 |
| 4 | SiO2 | 101.7 |

Designs with even more layers can be used to further improve the S and P splitting as a function of wavelength.

For example, silver, chromium, titanium, niobium, or other types of metal may replace aluminum as the material for the reflective layer 124. The protective layer 124 may use different materials other than silicon oxide, such as silicon dioxide ($SiO_2$) and titanium dioxide ($TiO_2$). When different types of oxides are used, the thickness of the protective layer 124 is adjusted accordingly to achieve a reduced amount of depolarization. In general, it is useful for the protective coating to be transparent to visible light, to have a pencil hardness of at least F when deposited on aluminum on a diffusing substrate such as Rosco 3026, and resistant to water and other solvents. The thickness must be greater for lower index materials and and less for higher index materials. The thickness can be adjusted to keep maximum reflection in the desired portion of the visible spectrum.

A projection screen having the surface profile similar to that shown in FIG. 3 can be used in a large traditional theater, or a dome theater. In such large-venue applications, the reflective surface of the screen is designed so that the intensity of reflected light at a 32-degree viewing angle (horizontal) is greater than 30% of the reflected light intensity when viewed directly. The surface profile and the coating above the metal reflective surface are designed so that the amount of depolarization is less than 0.7%.

What is claimed:

1. An assembly to use in a projection screen, the assembly comprising:
   a matte metal reflective surface; and
   a layer above the metal reflective surface to reduce an amount of difference in reflectivity of the metal reflective surface for incident light polarized in two different directions.

2. The assembly of claim 1 in which the layer reduces an amount of difference in reflectivity of the assembly for two polarizations of light.

3. The assembly of claim 1 in which the layer above the metal reflective surface has a nominal thickness between 50 and 200 nm.

4. The assembly of claim 1 in which the layer above the metal reflective surface has a nominal thickness between 60 and 75 nm or between 170 and 190 nm.

5. The assembly of claim 1 in which the layer above the metal reflective surface comprises at least one of an oxide, silicon oxide, silicon dioxide, or titanium dioxide.

6. The assembly of claim 1 in which the layer comprises a protective layer that is harder than the metal reflective surface.

7. The assembly of claim 1 in which the assembly, measured from a side of the assembly proximate to the protective layer, has a hardness greater than HB using a pencil hardness scale.

8. The assembly of claim 1 in which the metal reflective surface has a thickness less than 200 nm.

9. The assembly of claim 1 in which the metal reflective surface comprises at least one of aluminum, silver, titanium, and niobium.

10. The assembly of claim 1 in which the metal reflective surface covers at least a portion of the assembly that receives a projected image when used in the projection screen.

11. The assembly of claim 10 in which the layer above the metal surface covers more than 50% of the metal reflective surface.

12. The assembly of claim 1 further comprising a substrate to support the metal reflective surface.

13. The assembly of claim 1 in which the layer above the metal reflective surface comprises multiple sublayers.

14. The assembly of claim 1 further comprising another layer to improve stain resistance.

15. The assembly of claim 14 in which the layer to improve stain resistance comprises at least one of silicone and fluorocarbon.

16. An assembly to use in a projection screen, the assembly comprising:
   a reflective surface, and
   a layer above the reflective surface to reduce an amount of difference in reflectivity of the reflective surface for incident light polarized in two different directions, the reflective surface having features such that when surface angles of the surface are measured along a specified direction, the percentage of surface angles in the range of −40 to −20 degrees together with surface angles that are in the range of 20 to 40 degrees is greater than 5%.

17. The assembly of claim 16 in which the surface features have dimensions in a range of 0.5 to 500 µm.

18. The assembly of claim 16 in which the surface features have dimensions in a range of 1 to 100 µm.

19. The assembly of claim 16 in which the percentage of surface angles in the range of −90 to −40 degrees together with surface angles that are in the range of 40 to 90 degrees is less than 5%.

20. The assembly of claim 19 in which the surface features have dimensions in a range of 1 to 100 µm.

21. An assembly for use in a projection screen comprising:
   a metal reflective surface;
   a protective layer above the metal reflective surface, the protective layer comprising a material and a thickness that reduces depolarization of light reflected from the metal reflective surface; and
   a substrate to support the metal reflective surface, the metal reflective surface having surface features such that when surface angles of the metal reflective surface are measured along a specified direction, the percentage of surface angles in the range of −40 to −20 degrees together with surface angles that are in the range of 20 to 40 degrees is greater than 5%, the surface features having dimensions in a range of 1 to 100 µm.

22. The assembly of claim 21 in which the combination of the substrate, the metal reflective surface, and the protective layer has a hardness greater than HB using the pencil hardness scale as measured from a surface of the protective layer.

23. An apparatus to use in a projection screen, the apparatus comprising:
a surface having surface features such that when surface angles of the surface are measured along a specified direction, the percentage of surface angles in the range of −40 to −20 degrees together with surface angles that are in the range of 20 to 40 degrees is greater than 5%, and the percentage of surface angles in the range of −90 to −40 degrees together with surface angles that are in the range of 40 to 90 degrees is less than 5%, the surface having a reflectance greater than 70% for light having a wavelength between 400 nm and 700 nm, the surface features having dimensions smaller than 1 mm, and a substrate to support the surface.

24. The apparatus of claim 23 in which the surface features have dimensions in a range of 1 to 100 μm.

25. The apparatus of claim 23 further comprising a substrate to support the surface.

26. The apparatus of claim 25 in which the substrate comprises plastic or a polymeric coating on plastic.

27. The apparatus of claim 23 in which surface comprises a metal reflective surface.

28. The apparatus of claim 23 in which the percentage of surface angles in the range of −40 to −20 degrees together with surface angles that are in the range of 20 to 40 degrees is greater than 10%.

29. The apparatus of claim 23 in which the percentage of surface angles in the range of −90 to −40 degrees together with surface angles that are in the range of 40 to 90 degrees is less than 2.5%.

30. The apparatus of claim 23 in which the percentage of surface angles in the range of −90 to −50 degrees together with surface angles that are in the range of 50 to 90 degrees is less than 3%.

31. The apparatus of claim 23 in which the reflectance of the apparatus is greater than 50% for viewing angles between −32 to 32 degrees.

32. A method comprising:
with respect to an image projected on a projection screen, reflecting greater than 50% of incident light for horizontal viewing angles between −32 and 32 degrees, as compared to the reflectance at zero degree, and depolarizing incident polarized light by is less than 1%.

33. The method of claim 32 in which the reflecting comprises providing a screen having surface features configured such that when surface angles of the surface are measured along a specified direction, the percentage of surface angles in the range of −40 to −20 degrees together with surface angles that are in the range of 20 to 40 degrees is greater than 5% and the percentage of surface angles in the range of −90 to −40 degrees together with surface angles that are in the range of 40 to 90 is less than 5%.

34. The method of claim 33 in which the surface features have dimensions in a range of 1 to 100 μm.

* * * * *